(12) United States Patent
Raccah et al.

(10) Patent No.: US 11,540,040 B2
(45) Date of Patent: Dec. 27, 2022

(54) EAR-MOUNTED TWO-WAY RADIO SYSTEM

(71) Applicant: Midland Radio Corporation, Kansas City, MO (US)

(72) Inventors: Guy Raccah, Kowloon (HK); William H Darden, IV, Cary, NC (US)

(73) Assignee: MIDLAND RADIO CORPORATION, Kansas City, MO (US)

( * ) Notice: Subject to any disclaimer, the term of this patent is extended or adjusted under 35 U.S.C. 154(b) by 0 days.

(21) Appl. No.: 17/452,330

(22) Filed: Oct. 26, 2021

(65) Prior Publication Data

US 2022/0132234 A1   Apr. 28, 2022

Related U.S. Application Data

(60) Provisional application No. 63/105,735, filed on Oct. 26, 2020.

(51) Int. Cl.
| H04R 1/10 | (2006.01) |
| H04W 4/80 | (2018.01) |
| H04R 5/033 | (2006.01) |

(52) U.S. Cl.
CPC ........... *H04R 1/1016* (2013.01); *H04R 1/105* (2013.01); *H04R 5/0335* (2013.01); *H04W 4/80* (2018.02); *H04R 2420/07* (2013.01)

(58) Field of Classification Search
CPC .... H04R 1/1016; H04R 1/105; H04R 5/0335; H04R 2420/07; H04R 1/1041; H04R 2201/107; H04W 4/80
See application file for complete search history.

(56) References Cited

U.S. PATENT DOCUMENTS

| 5,446,788 A | * | 8/1995 | Lucey | .................... | H04R 1/105 |
| | | | | | D14/206 |
| 6,101,260 A | * | 8/2000 | Jensen | ................. | H04R 1/1066 |
| | | | | | 381/381 |

(Continued)

FOREIGN PATENT DOCUMENTS

| CA | 2939869 C | 3/2019 |
| CN | 201160277 | 12/2008 |

(Continued)

OTHER PUBLICATIONS

GearVita, Xiaomi Mijia Beebest BE501 Bluetooth Walkie Talkie Headset, 10 pages—Applicant Admitted Prior Art.

(Continued)

*Primary Examiner* — Angelica M McKinney
(74) *Attorney, Agent, or Firm* — Avek IP, LLC

(57) ABSTRACT

A two-way radio system includes multiple units each having a hub, speaker, primary clip, secondary clip, antenna, and microphone. The hub has exterior and interior sides defining a hub cavity therebetween. The speaker is in the hub cavity and has an output directed to a speaker opening on the hub interior side. The primary clip extends from the hub for selective attachment to a wearer's ear such that the speaker opening is directed to the wearer's ear canal. The secondary clip extends outwardly from the hub exterior side such that the hub exterior side is between the secondary clip and the hub interior side. The secondary clip has an antenna support on an interior side of the secondary clip and an antenna cap on an exterior side of the secondary clip. The antenna support and the antenna cap define an antenna cavity, and the antenna is in the antenna cavity.

19 Claims, 25 Drawing Sheets

(56) References Cited

U.S. PATENT DOCUMENTS

| | | | |
|---|---|---|---|
| 8,879,722 B1 | 11/2014 | Wang et al. | |
| 9,998,850 B2 | 6/2018 | Broadley et al. | |
| 2002/0090105 A1* | 7/2002 | Jensen | H04R 1/08 |
| | | | 381/381 |
| 2008/0220831 A1 | 9/2008 | Alameh et al. | |
| 2008/0273735 A1* | 11/2008 | Burson | H04R 1/083 |
| | | | 381/363 |
| 2011/0096938 A1* | 4/2011 | Yuan | A61F 11/06 |
| | | | 381/73.1 |
| 2015/0237433 A1* | 8/2015 | Tran | H04R 1/1066 |
| | | | 381/375 |
| 2015/0237434 A1* | 8/2015 | Tran | H04R 1/1016 |
| | | | 381/380 |
| 2020/0120410 A1 | 4/2020 | Akaike et al. | |
| 2021/0195312 A1* | 6/2021 | Woo | H04R 1/1066 |

FOREIGN PATENT DOCUMENTS

| | | |
|---|---|---|
| CN | 210724784 U | 6/2020 |
| KR | 20080014417 A | 2/2008 |
| KR | 20110064684 A | 6/2011 |
| KR | 101745866 B1 | 6/2017 |
| WO | 2022094545 A1 | 5/2022 |

OTHER PUBLICATIONS

Quail digital, Pro11 Headset System Installation Manual, Aug. 9, 2021, 8 pages, London, United Kingdom.

Quail digital, Pro7 Headset System User Guide, Jul. 11, 2016, 16 pages, London, United Kingdom.

International Search Report and Written Opinion, dated Feb. 11, 2022, 11 pages, issued in International Application No. PCT/US21/72025.

* cited by examiner

EAR-MOUNTED TWO-WAY RADIO SYSTEM

RELATED APPLICATIONS

This application claims priority to U.S. Application No. 63/105,735, filed Oct. 26, 2020, which is incorporated by reference in its entirety herein.

FIELD OF THE DISCLOSURE

The disclosure relates generally to the field of communications systems. More specifically, the disclosure relates to a two-way radio system that is ear mounted.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

According to an embodiment, a short-range communication system includes a plurality of units. Each of the units has a hub, a speaker, a primary clip, a secondary clip, an antenna, and a microphone. The hub has an exterior side and an interior side defining a hub cavity therebetween. The interior side has a speaker opening. The speaker is in the hub cavity and has an output directed to the speaker opening. The primary clip extends from the hub for selective attachment to a wearer's ear such that the speaker opening is directed to an ear canal of the wearer. The primary clip has a distal segment and a proximal segment, and the primary clip proximal segment connects the primary clip distal segment to the hub. The primary clip proximal segment is resiliently flexible such that a distance between the hub and the primary clip distal segment is variable. The secondary clip extends outwardly from the hub exterior side such that the hub exterior side is between the secondary clip and the hub interior side. The antenna is in the secondary clip.

According to another embodiment, a two-way radio system includes a plurality of units. Each of the units has a hub, a speaker, a primary clip, a secondary clip, an antenna, and a microphone. The hub has an exterior side and an interior side defining a hub cavity therebetween. The interior side has a speaker opening. The speaker is in the hub cavity and has an output directed to the speaker opening. The primary clip extends from the hub for selective attachment to a wearer's ear such that the speaker opening is directed to an ear canal of the wearer. The secondary clip extends outwardly from the hub exterior side such that the hub exterior side is between the secondary clip and the hub interior side. The secondary clip has an antenna support and an antenna cap; the antenna support is on an interior side of the secondary clip, and the antenna cap is on an exterior side of the secondary clip. The antenna support and the antenna cap define an antenna cavity, and the antenna is in the antenna cavity.

BRIEF DESCRIPTION OF THE SEVERAL VIEWS OF THE DRAWINGS

Illustrative embodiments of the disclosure are described in detail below with reference to the attached figures.

DETAILED DESCRIPTION

Figure 1:
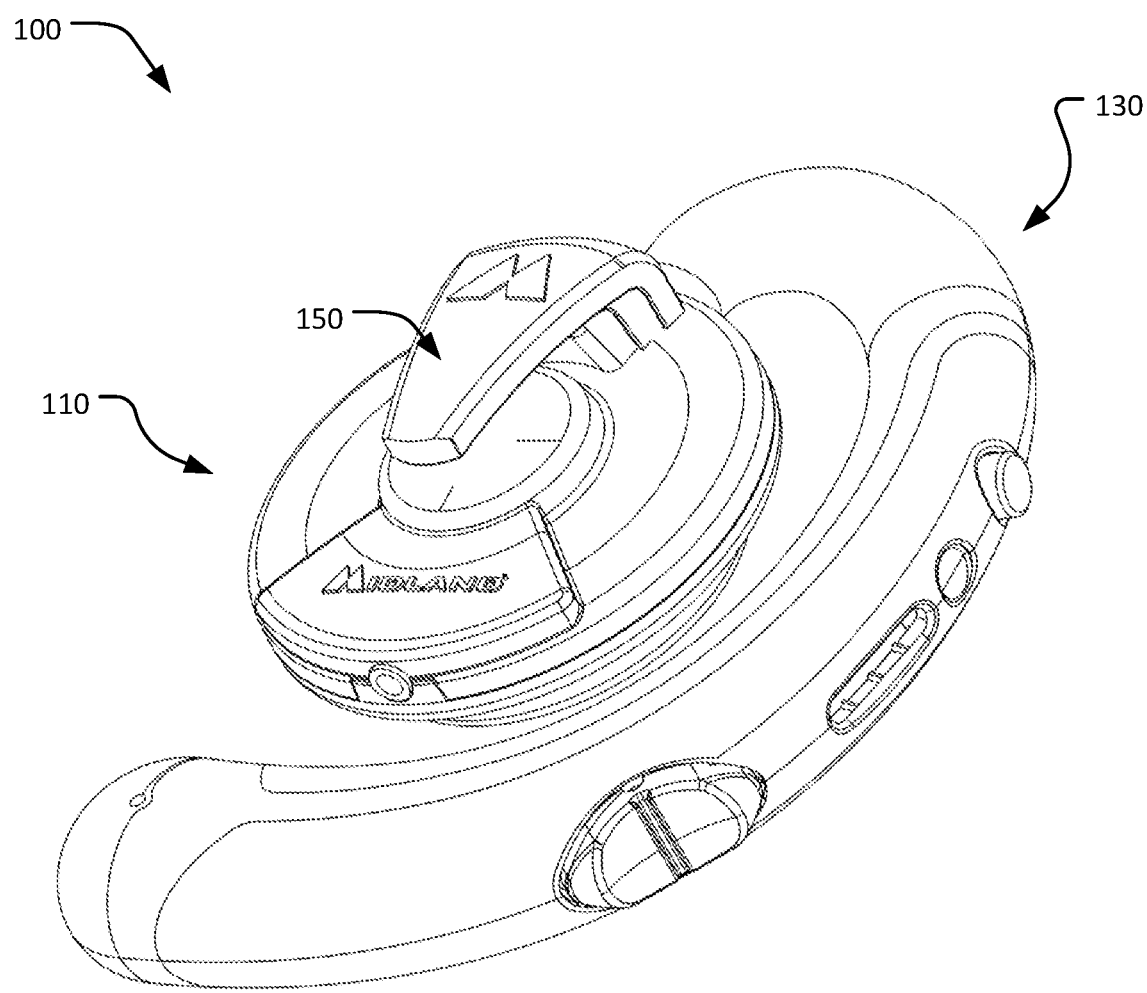
FIG. 1 is a front perspective view of a two-way radio unit, according to an embodiment of the current disclosure.
Figure 2:
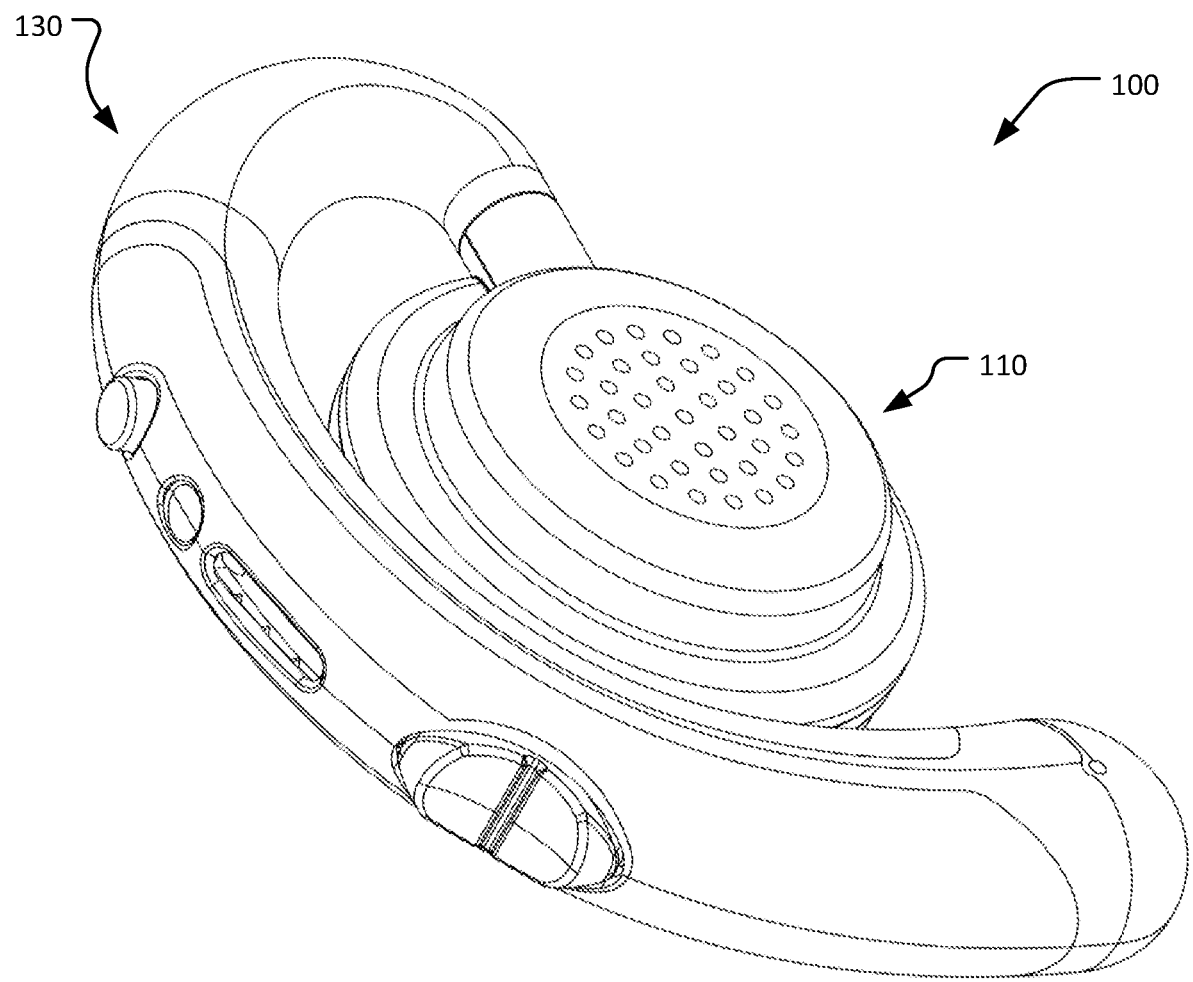
FIG. 2 is a rear perspective view of the two-way radio unit of FIG. 1.

FIGS. 1-18 disclose short-range communication systems having two-way radio units that are ear mounted. A two-way radio according to an embodiment 100 includes a hub 110, a primary clip 130, a secondary clip 150, and various electronic components (e.g., a first circuit board 201; a speaker 203; a microphone 205; a push to talk button 207; a second circuit board 209; user inputs 211 such as switches, buttons, knobs, et cetera; a battery 213; and/or an antenna 215).

Figure 5:
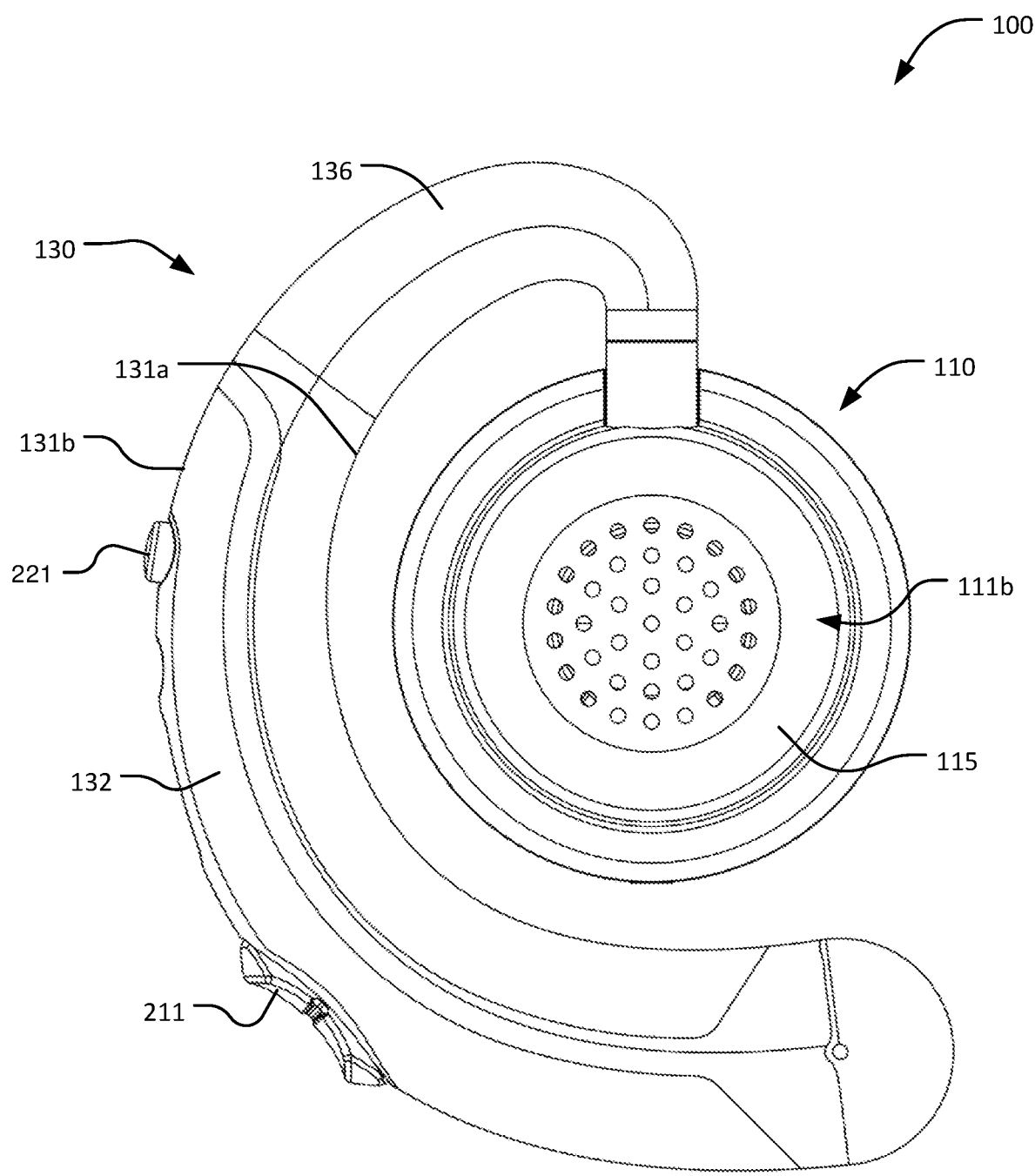
FIG. 5 is a rear view of the two-way radio unit of FIG. 1.
Figure 11A:
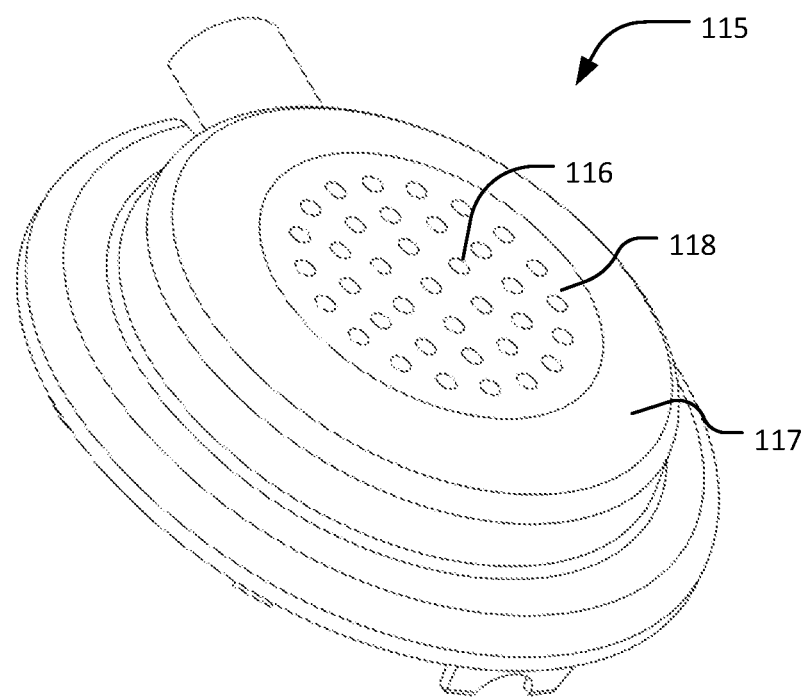
FIG. 11A is a perspective view of the interior housing of the two-way radio unit of FIG. 1.
Figure 11B:
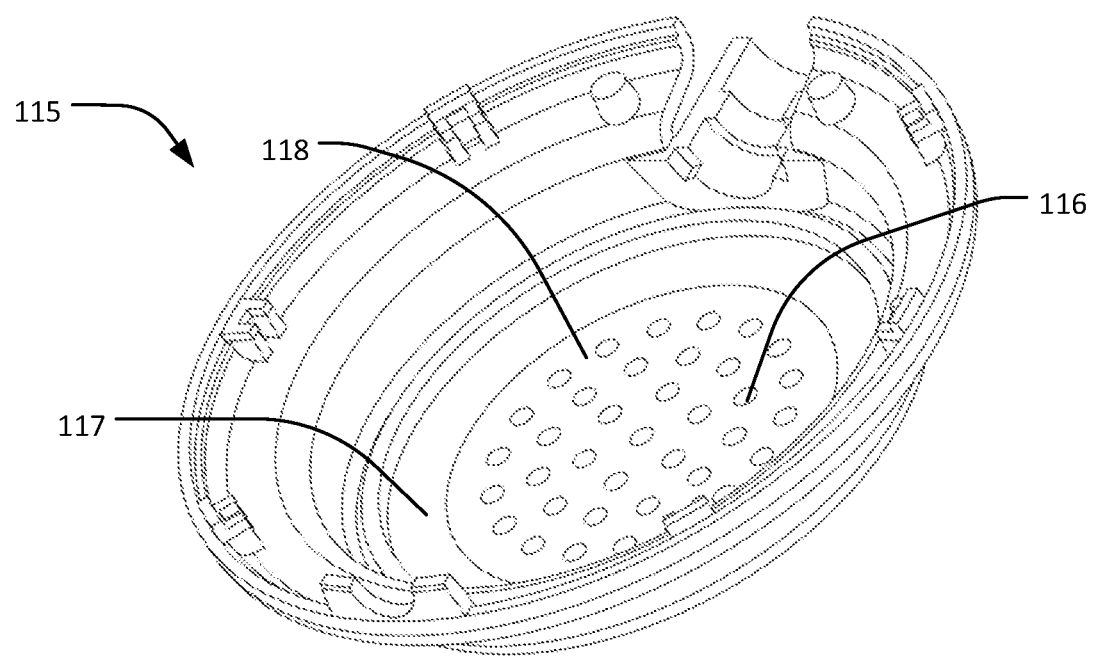
FIG. 11B is an opposite perspective view of the interior housing of the two-way radio unit of FIG. 1.
Figure 12A:
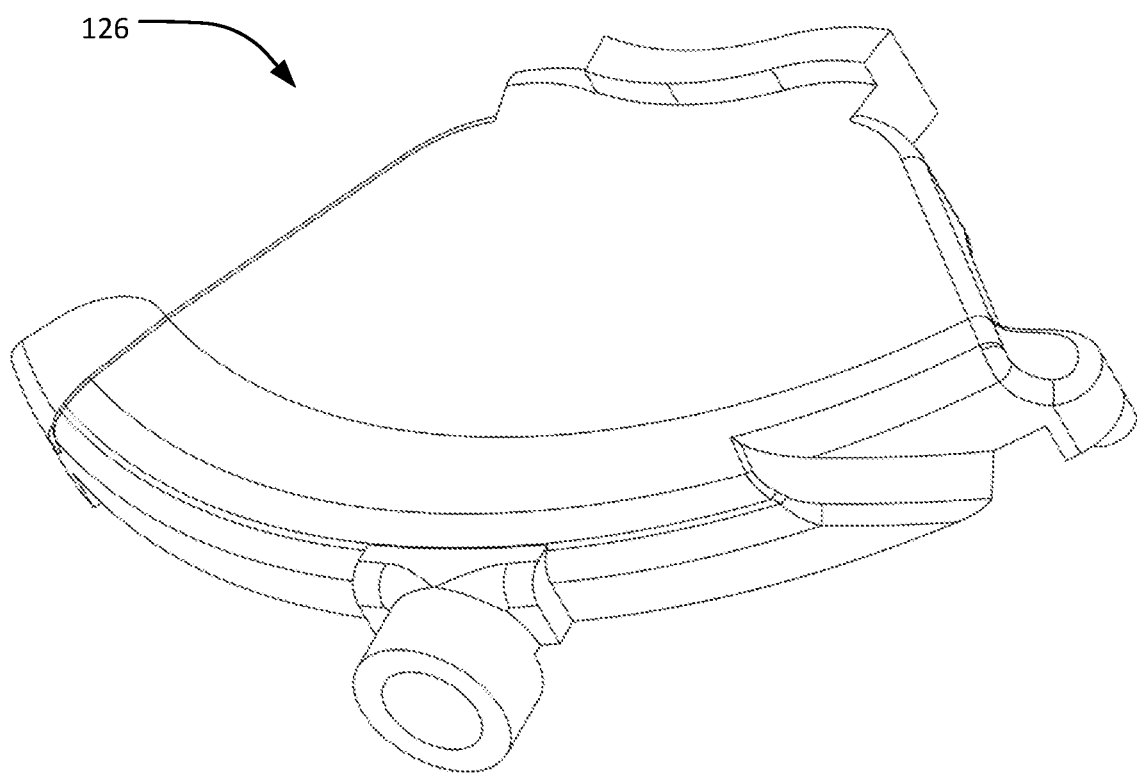
FIG. 12A is a perspective view of the support bridge of the two-way radio unit of FIG. 1.
Figure 12B:
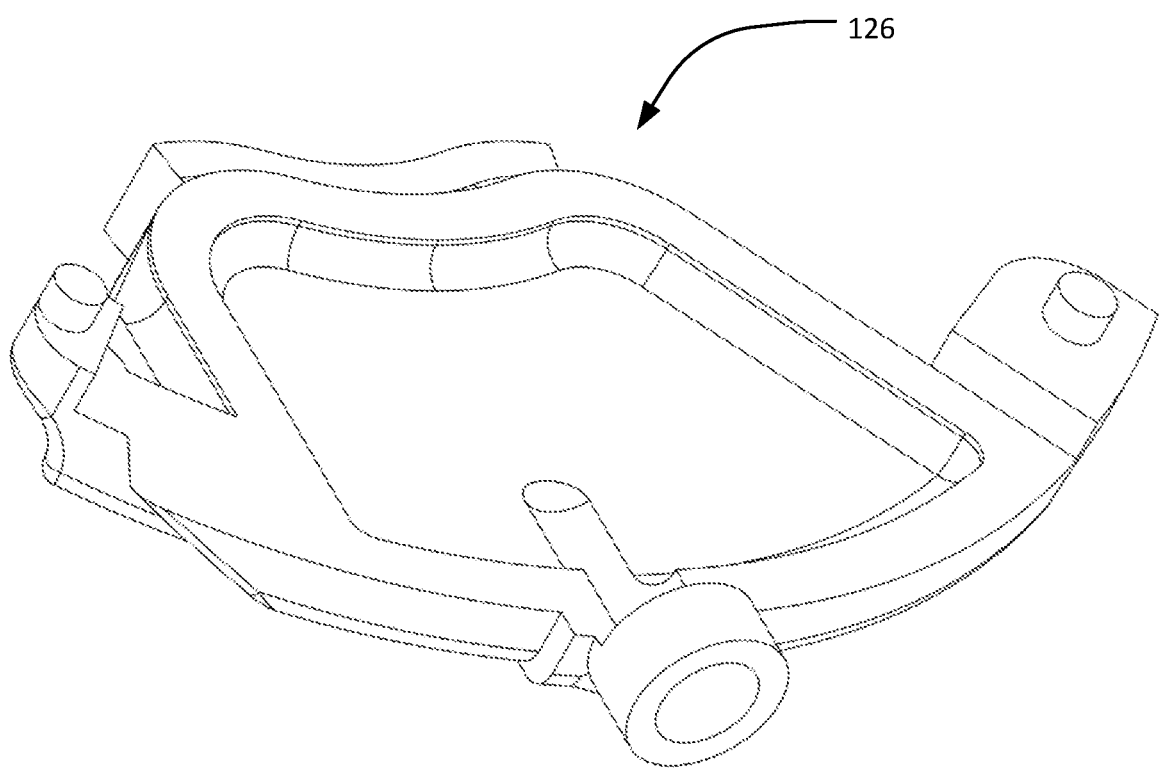
FIG. 12B is an opposite perspective view of the support bridge of the two-way radio unit of FIG. 1.
Figure 13A:
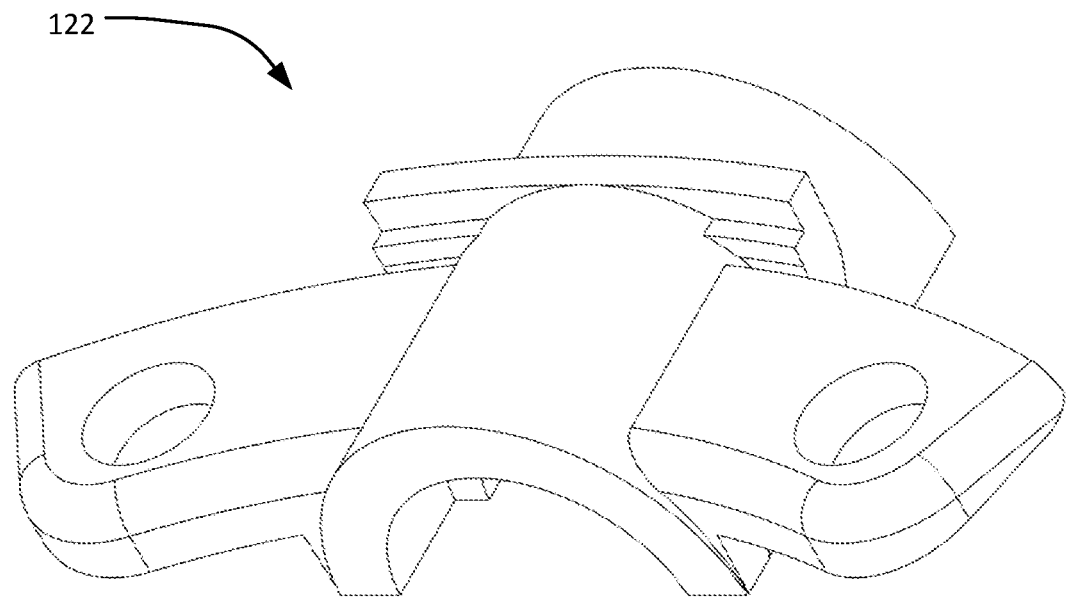
FIG. 13A is a perspective view of the neck lock of the two-way radio unit of FIG. 1.
Figure 13B:
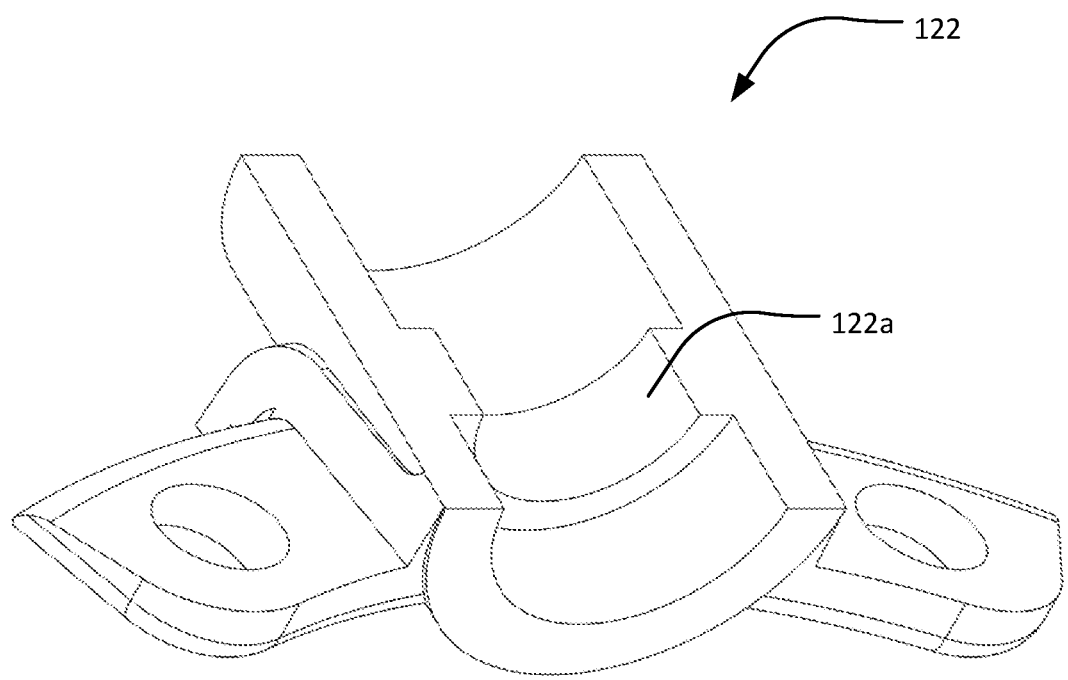
FIG. 13B is an opposite perspective view of the neck lock of the two-way radio unit of FIG. 1.
Figure 14A:
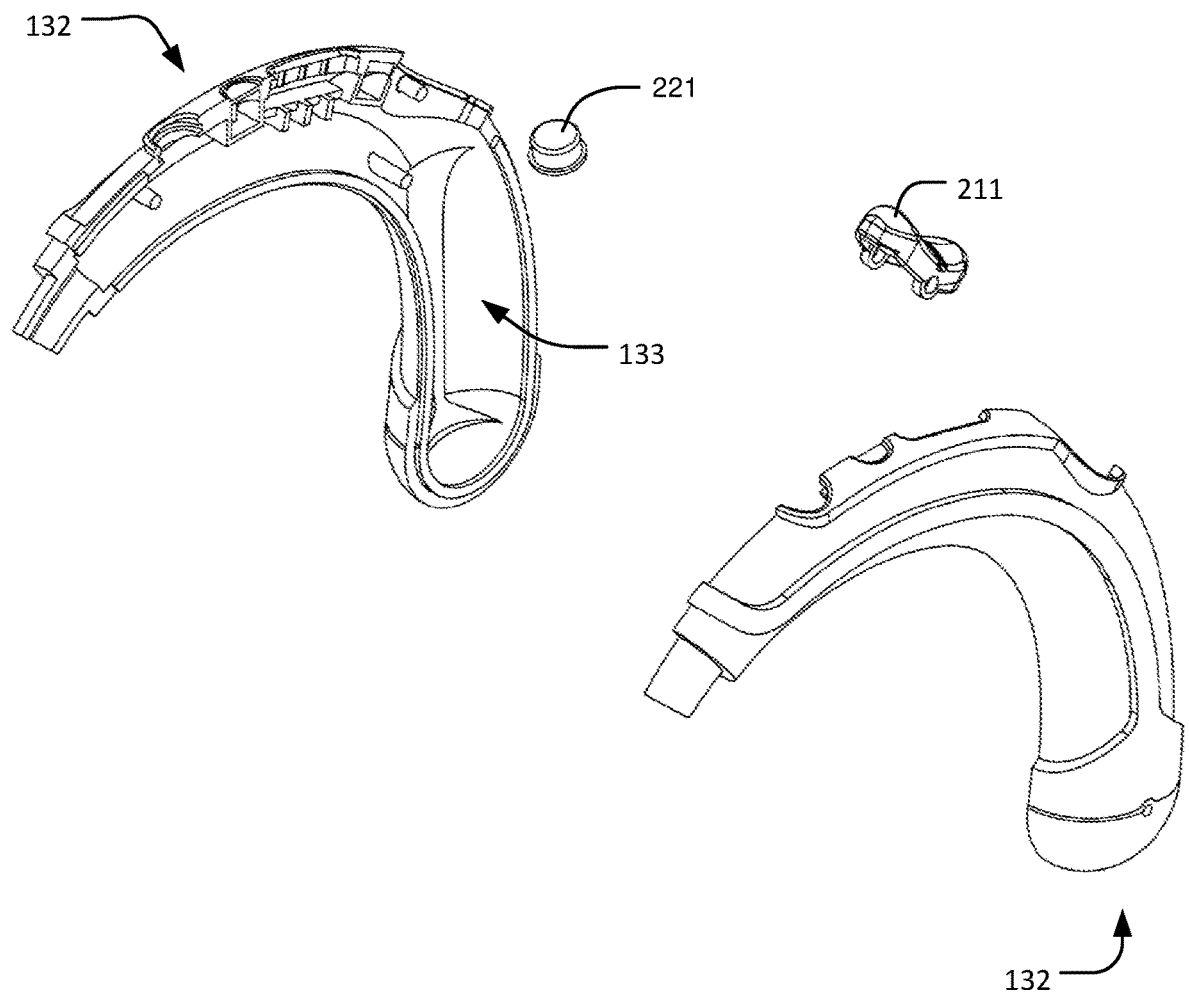
FIG. 14A is an exploded perspective view of the distal segment of the primary clip of the two-way radio unit of FIG. 1
Figure 14B:
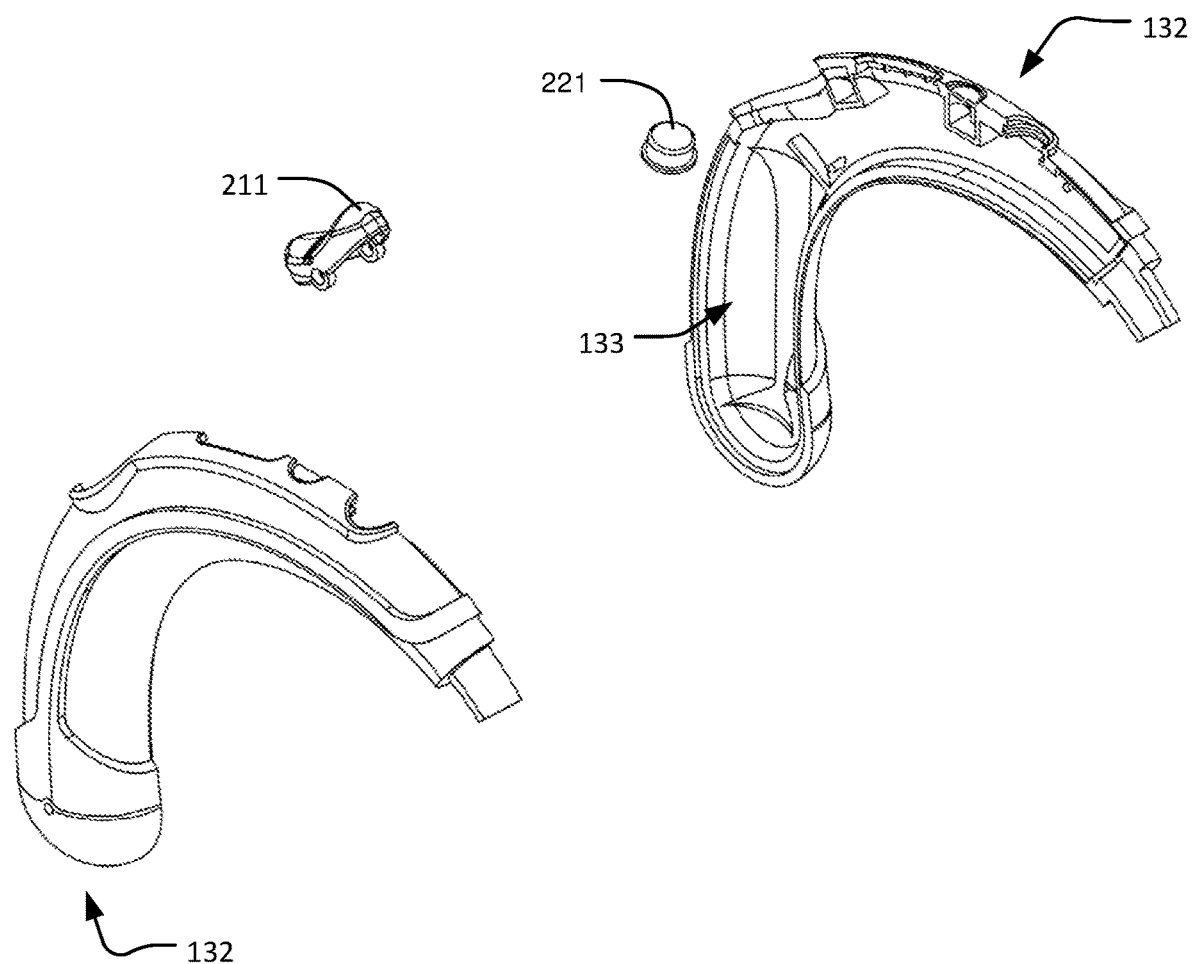
FIG. 14B is an opposite exploded perspective view of the distal segment of the primary clip of the two-way radio unit of FIG. 1
Figure 15:
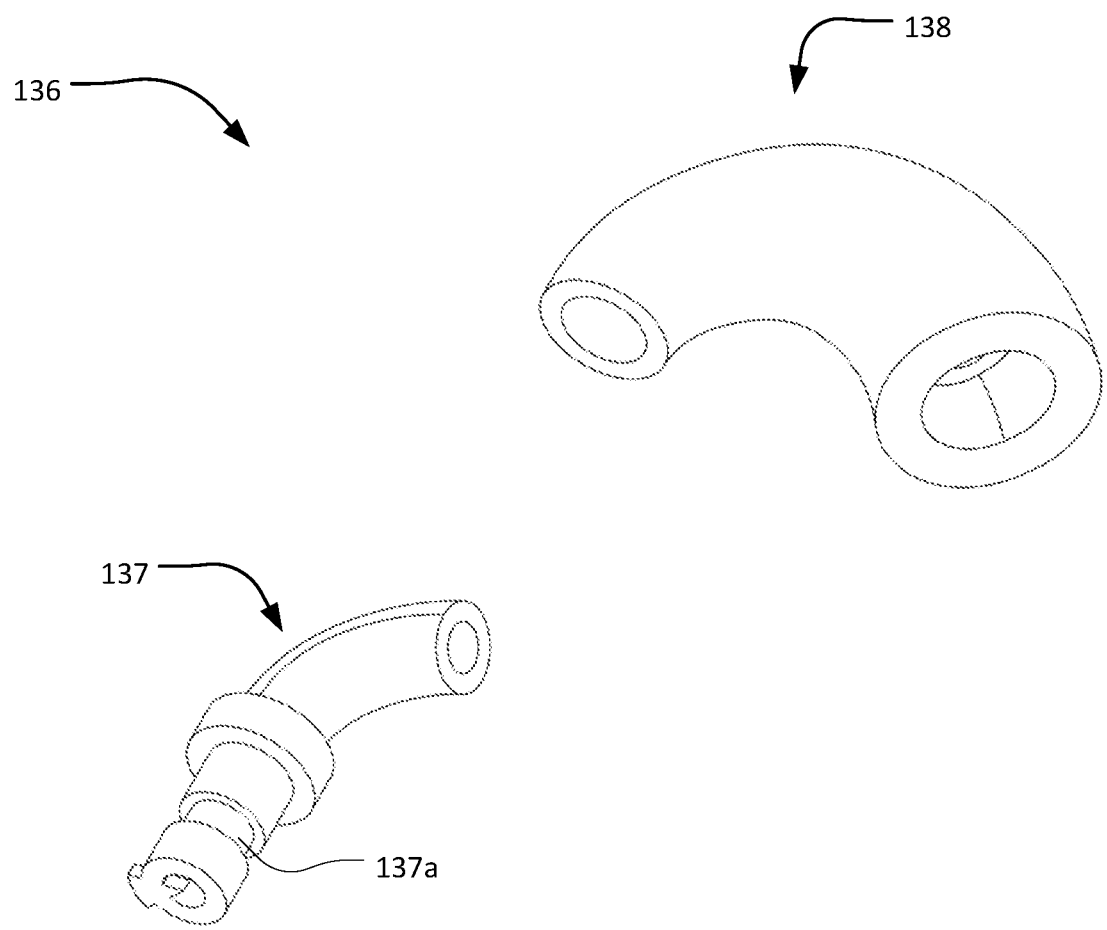
FIG. 15 is an exploded view of the proximal segment of the primary clip of the two-way radio unit of FIG. 1.
Figure 16A:
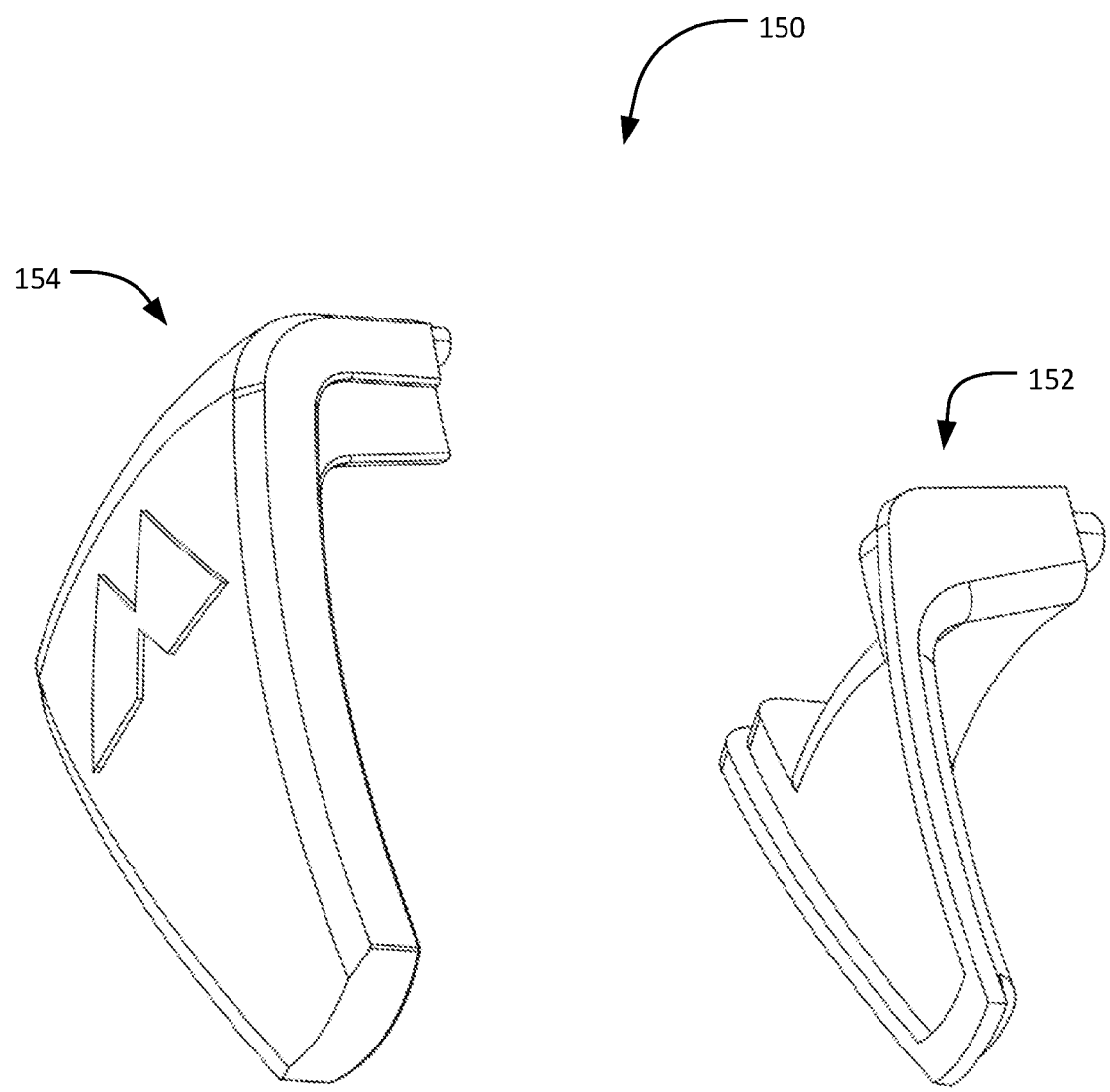
FIG. 16A is an exploded perspective view of the secondary clip of the two-way radio unit of FIG. 1
Figure 16B:
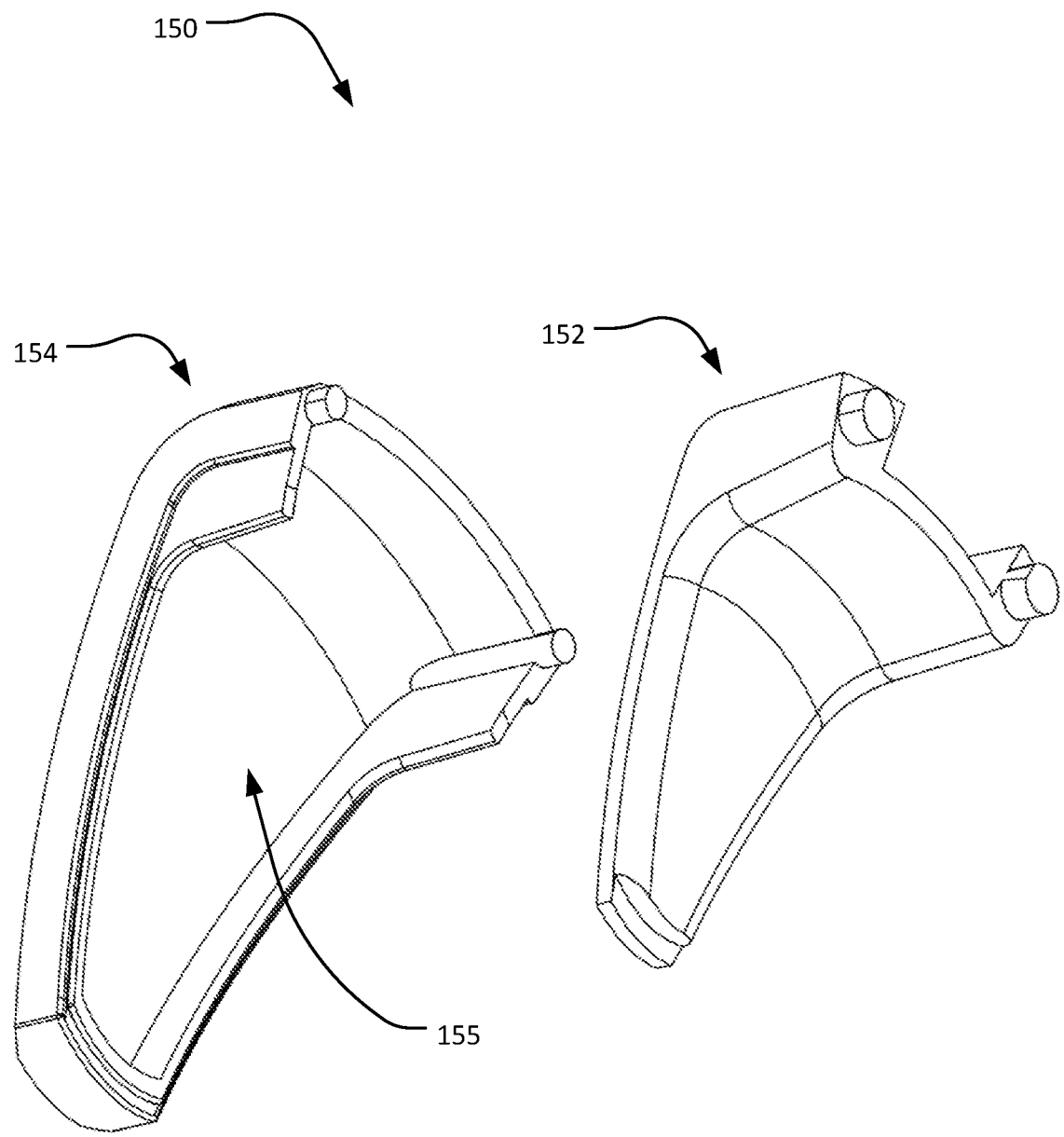
FIG. 16B is an opposite exploded perspective view of the secondary clip of the two-way radio unit of FIG. 1

The hub 110 has an exterior side 111a and an interior side 111b and defines a hub cavity 112 therebetween. In the embodiment 100, the hub 110 has an exterior housing 113 at the exterior side 111a and an interior housing 115 at the interior side 111b. The interior side 111b has at least one speaker opening 116, and (as shown in FIGS. 5 and 11A) the interior side 111b may have an annular surface 117 and a recessed central area 118 therein which includes at least some of the speaker openings 116. The exterior and interior housings 113, 115 may be constructed of any appropriate materials (e.g., plastic, composite, metal, and/or rubber, et cetera), may include subportions, and may be coupled together by any appropriate fastening devices and techniques (e.g., clips, screws, and/or adhesive, et cetera).

It may be particularly desirable for a neck lock 122 (FIGS. 3A, 4, 13A, and 13B) to be fastened to the exterior housing 113 and/or the interior housing 115 (e.g., through clips, screws, and/or adhesive, et cetera) for locking the primary clip 130 to the hub 110, as discussed in additional detail below.

A support bridge 126 (FIGS. 3A, 12A, and 12B) may be located in the hub cavity 112 for supporting the push to talk button 207 such that the push to talk button 207 is accessible at the hub exterior side 111a without interfering with any components inside the hub 110. For example, the push to talk button 207 may be accessible at a flexible area 113a of the exterior housing 113. Or, said differently, the flexible area 113a may define a user interface of the push to talk button 207.

Figure 3A:
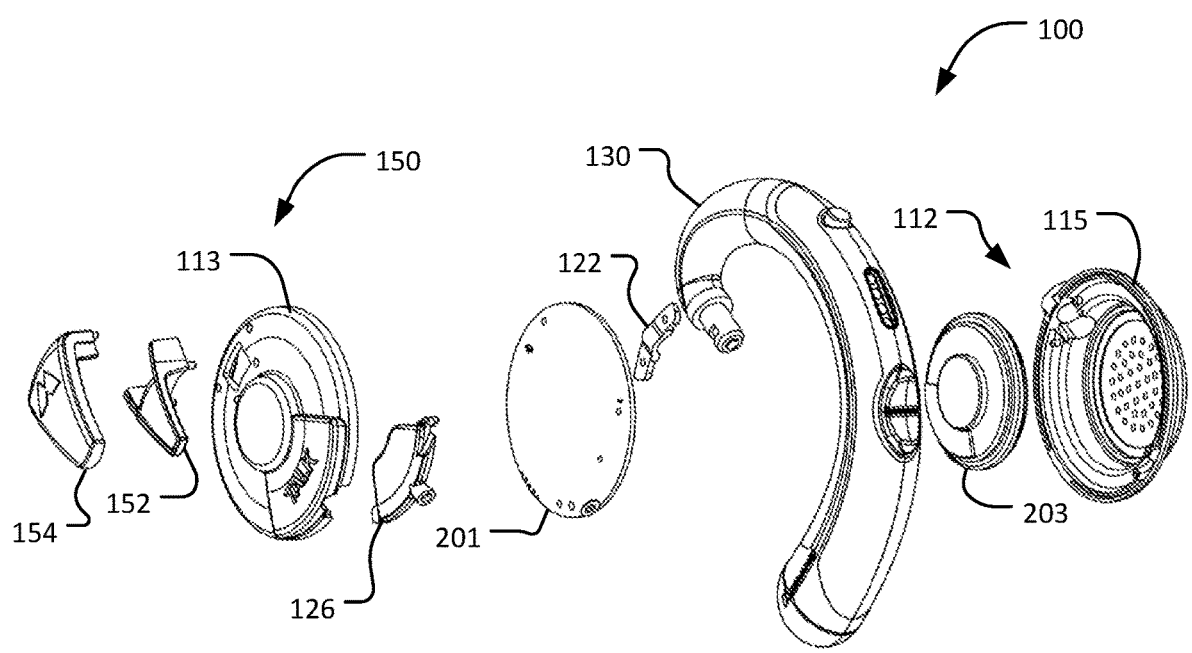
FIG. 3A is a partially exploded view of the two-way radio unit of FIG. 1, with some elements omitted for clarity.
Figure 3B:
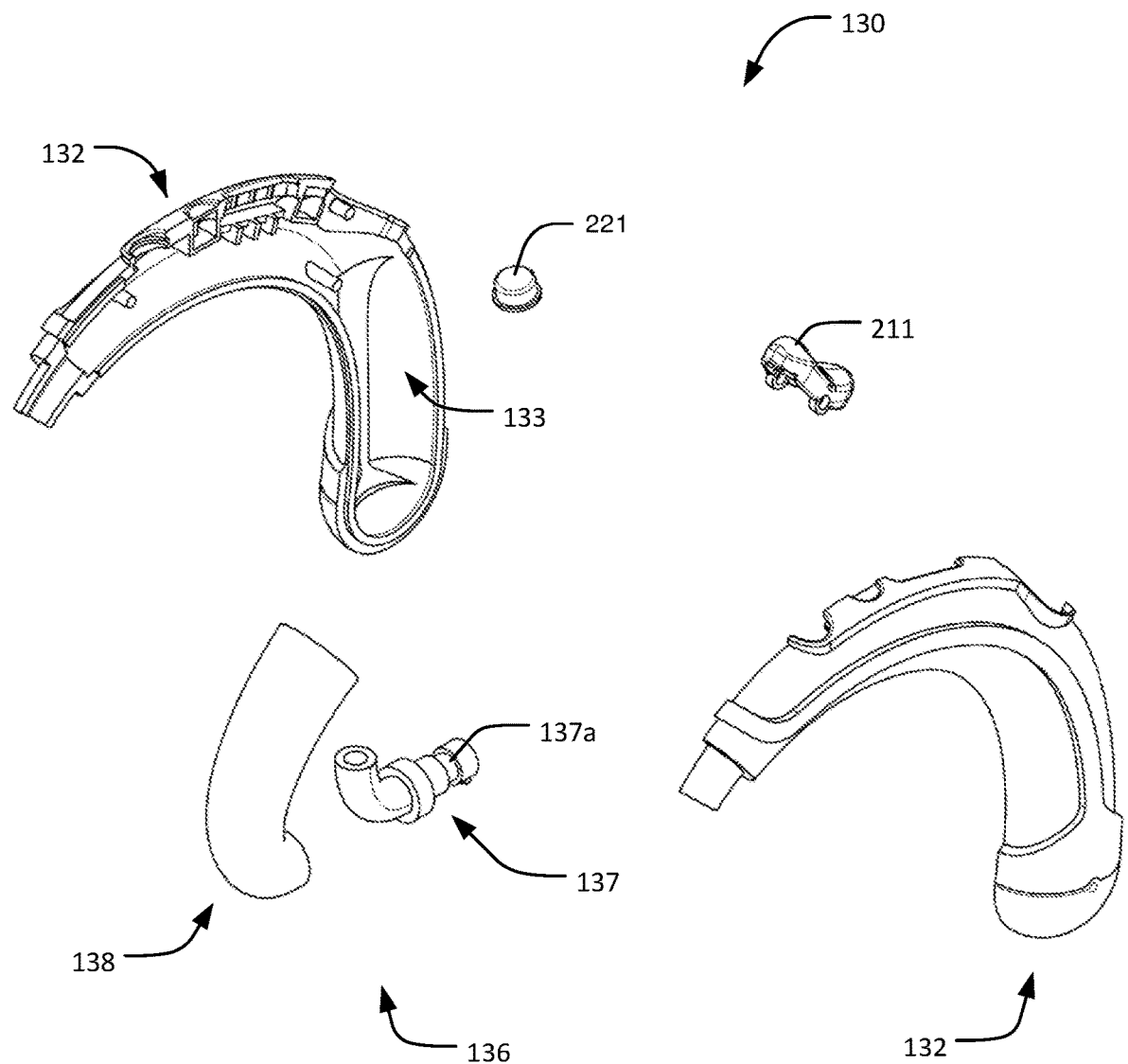
FIG. 3B is an exploded view of part of the two-way radio unit of FIG. 1, with some elements omitted for clarity.

As shown in FIG. 3A, the speaker 203 is located in the hub cavity 112 such that an output of the speaker 203 is directed to the speaker openings 116, and the first circuit board 201 is located in the hub cavity 112 between the speaker 203 and the hub exterior side 111a.

Figure 4:
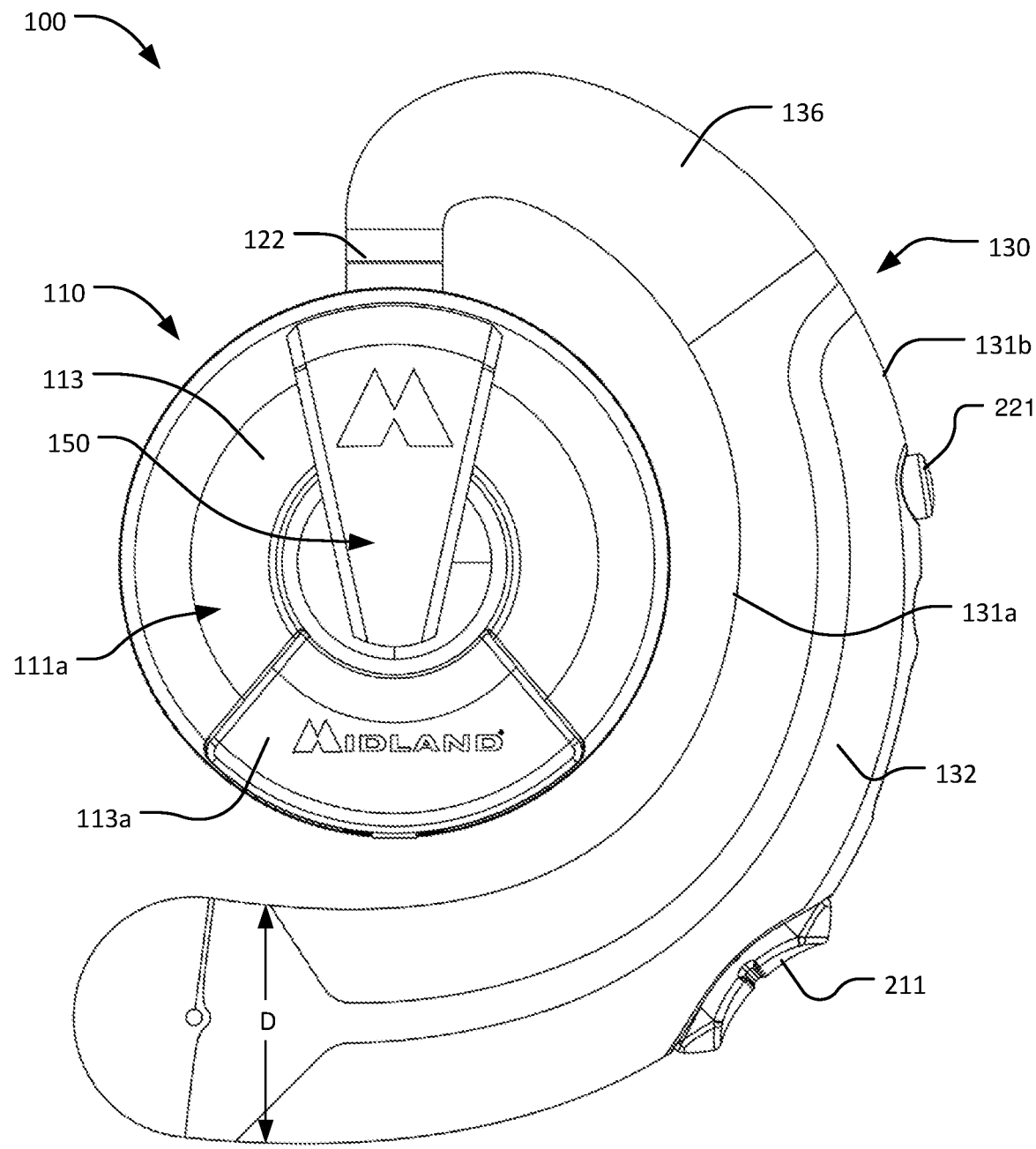
FIG. 4 is a front view of the two-way radio unit of FIG. 1.

The primary clip 130 extends from the hub 110 for selective attachment to a wearer's ear such that the speaker opening 116 is directed to an ear canal of the wearer. In the embodiment 100, the primary clip 130 has a distal segment 132 and a proximal segment 136. As shown in FIG. 4, it may be particularly desirable for a diameter D of the primary clip 130 to progressively enlarge along the proximal and distal segments 136, 132, with the diameter D having a maximum value at the distal segment 132. Both a near side 131a and a far side 131b of the primary clip 130 may be generally arcuate along at least a portion of the proximal and distal segments 136, 132, as shown in FIG. 4, with the arc of the far side 131b having a larger radius than the arc of the near side 131a and with a center point of each arc being offset relative to one another.

The distal segment 132 defines a cavity 133 and may be initially formed in at least two pieces that can be permanently or removably attached together (e.g., through clips, screws, and/or adhesive, et cetera). Various components may be housed in the cavity 133—for example, the second circuit board 209 and the battery 213. And other components (e.g., the user inputs 211) may extend from the distal segment 132 and optionally extend into the cavity 133. By including both the first and second circuit boards 201, 209, the size of the hub 110 may be reduced relative to embodiments having only a single (larger) circuit board. In addition, placing the second circuit board 209 and the battery 213 in the distal segment 132 may provide an improved weight balance for the user. Other (nonexclusive) example components that may be included in the distal segment 132 include orientation magnets 221 for orienting the unit 100 relative to a charging device and charging components (e.g., contacts) 223 for transferring energy from the charging device to the battery 213. While it may be particularly desirable for the distal segment 132 to be generally rigid, rubberized or other appropriate coatings may be applied through over molding, dipping, or other manufacturing processes (whether now known or later developed).

The proximal segment 136 connects the distal segment 132 to the hub 110 and is preferably resiliently flexible such that a distance between the hub 110 and the primary clip distal segment 132 is variable. To allow such resilient flexibility, rubber and/or other appropriate materials may be used (either with or without flexible metal or other internal support) for the proximal segment 136.

The proximal segment 136 may further be rotatably coupled to the hub 110 such that the primary clip 130 is orbital about the hub 110, i.e., is either partially or completely rotatable (for example, in path P1) around the hub 110. Like the distal segment 132, the proximal segment 136 may include multiple pieces. In the embodiment 100, the proximal segment 136 includes a neck 137 that may be coupled to a body 138 through a press fit, adhesive, and/or any other appropriate fastening device or method. The neck 137 includes a recess 137a, and the neck lock 122 has a protrusion 122a that fits inside the recess 137a and locks the neck 137 (and thus the proximal segment 136) to the hub 110 when the neck lock 122 is fastened. By extending the recess 137a around part or all of the neck 137, the neck 137 may rotate relative to the neck lock 122.

Figure 6:
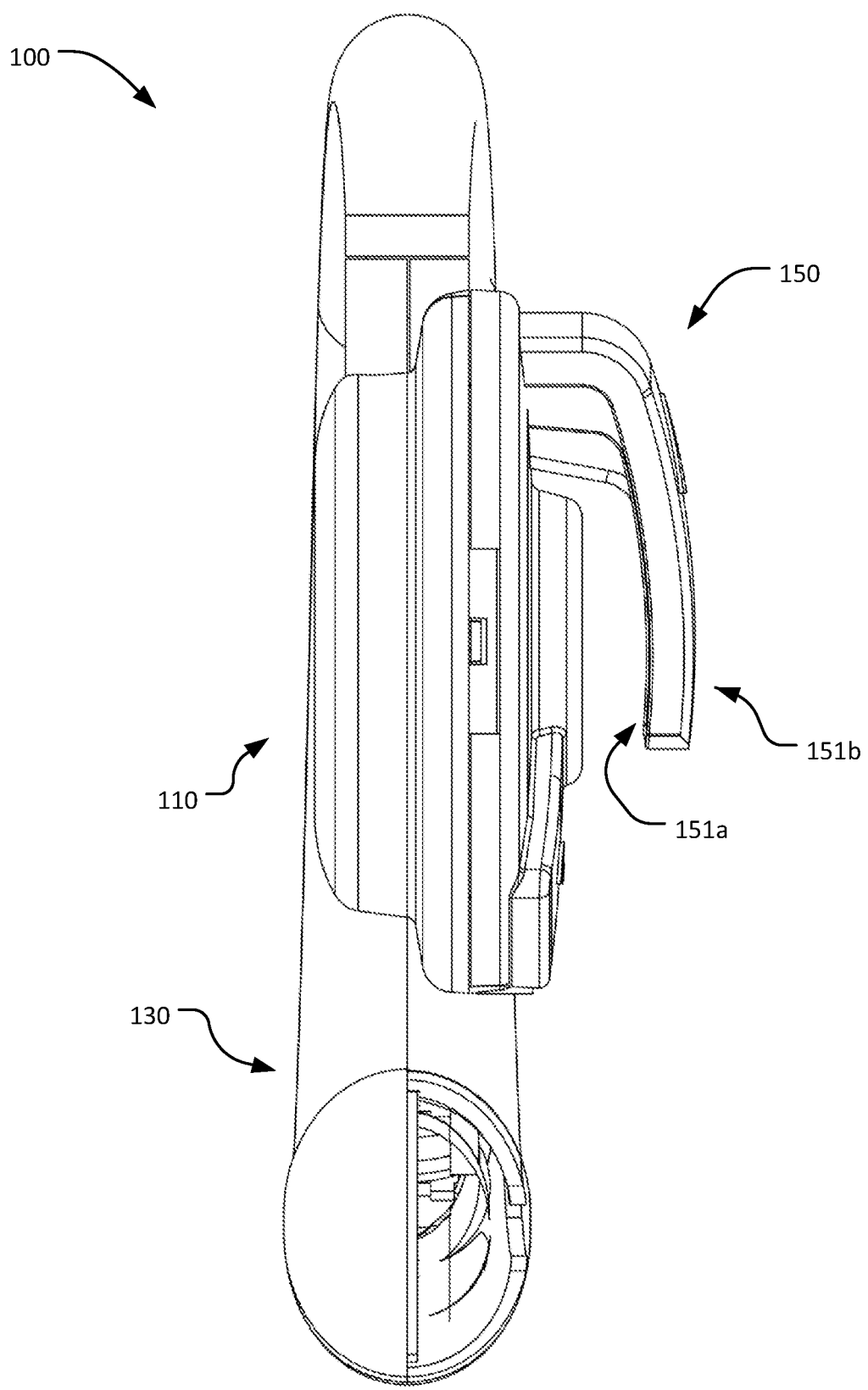
FIG. 6 is an end view of the two-way radio unit of FIG. 1.
Figure 7:
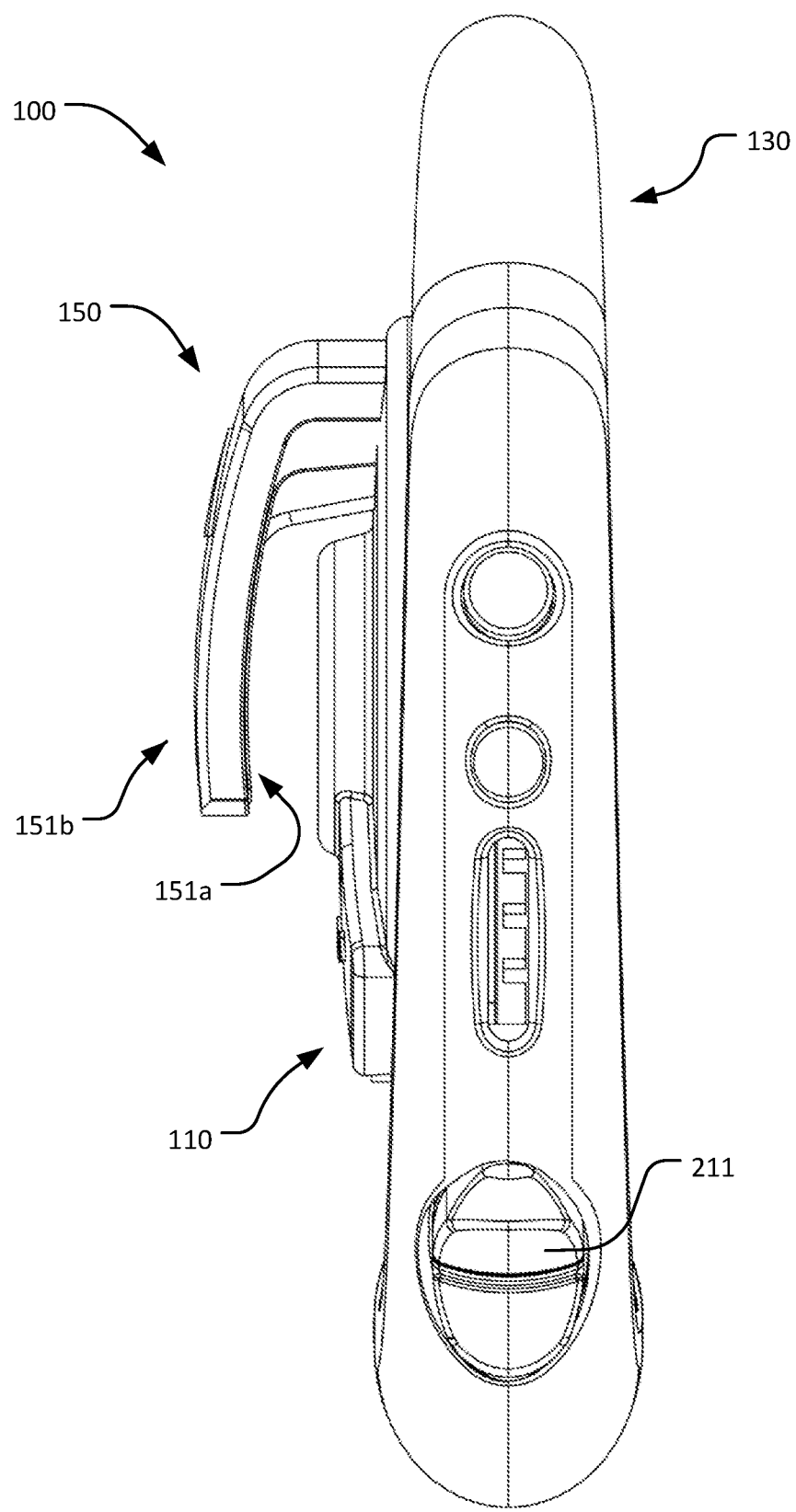
FIG. 7 is an opposite end view of the two-way radio unit of FIG. 1.
Figure 8:
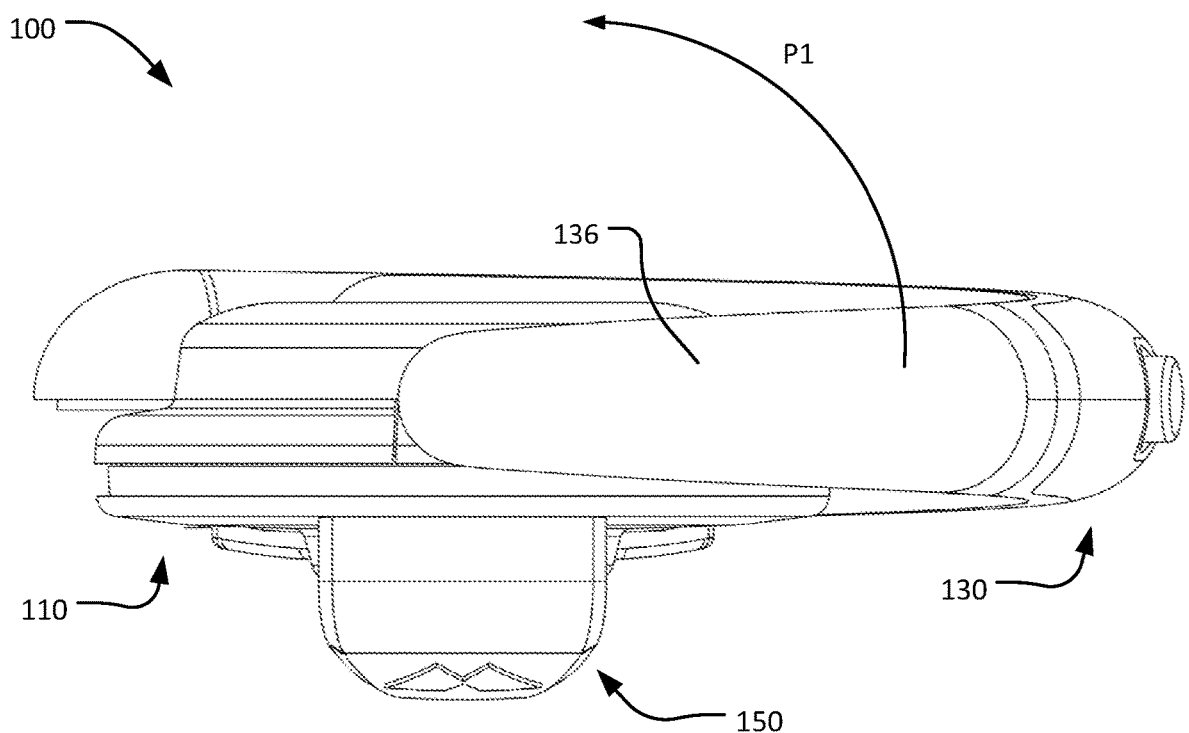
FIG. 8 is a top view of the two-way radio unit of FIG. 1.
Figure 9:
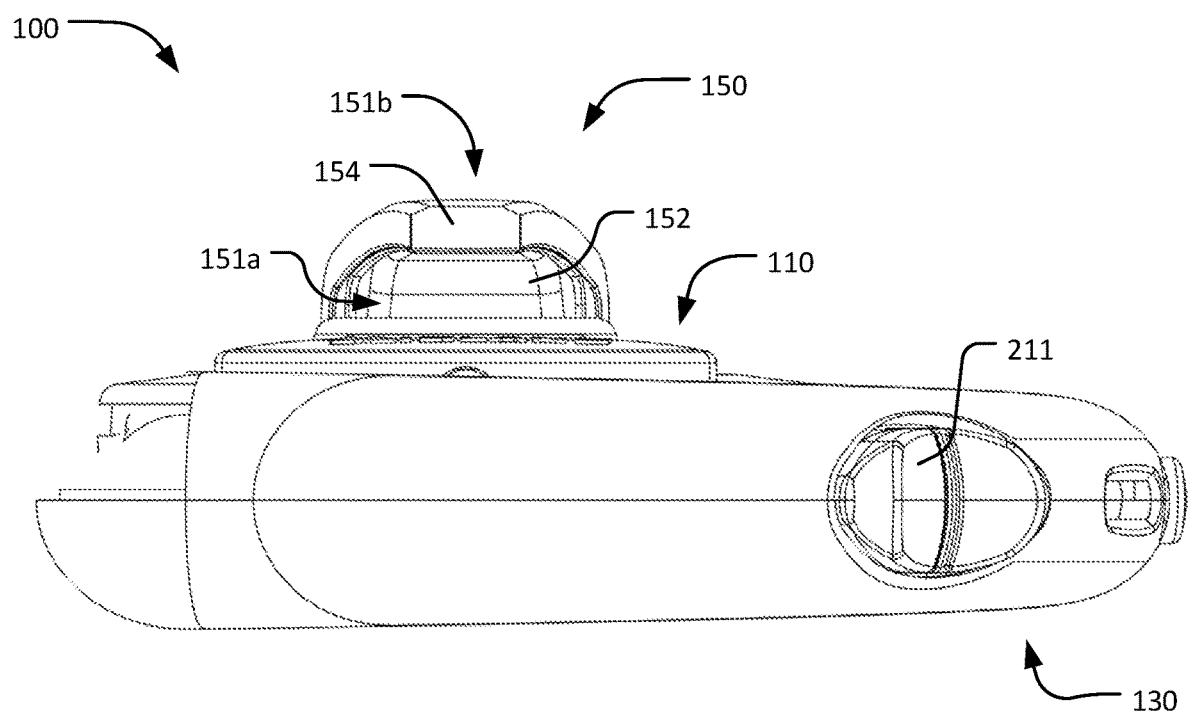
FIG. 9 is a bottom view of the two-way radio unit of FIG. 1.
Figure 10A:
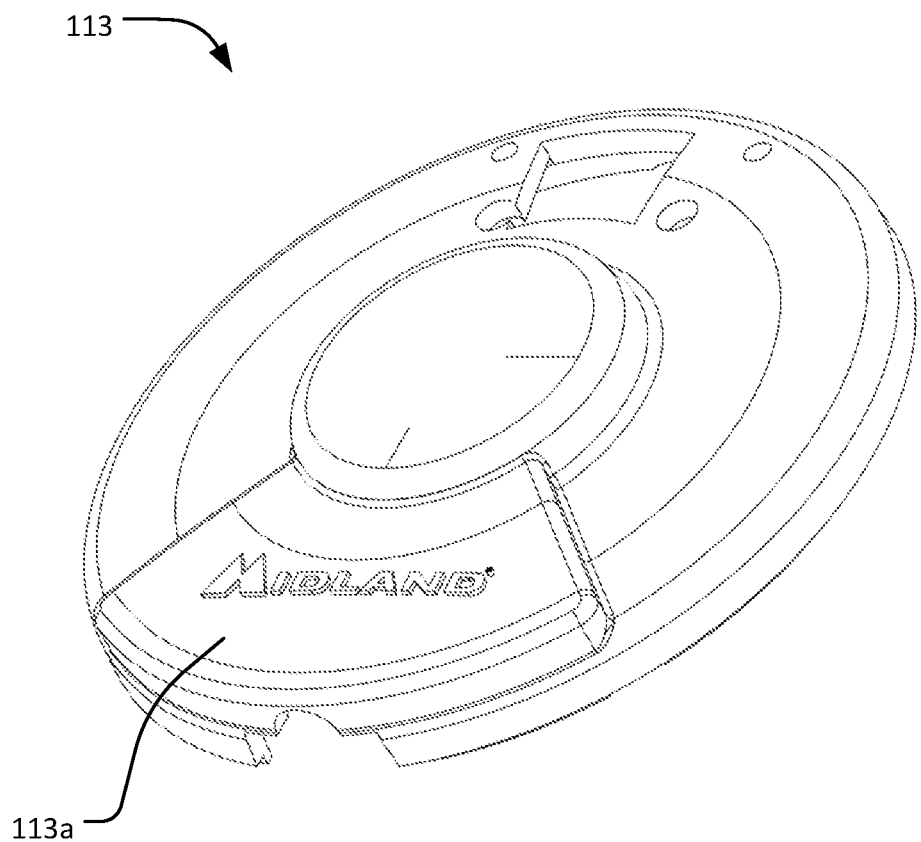
FIG. 10A is a perspective view of the exterior housing of the two-way radio unit of FIG. 1.
Figure 10B:
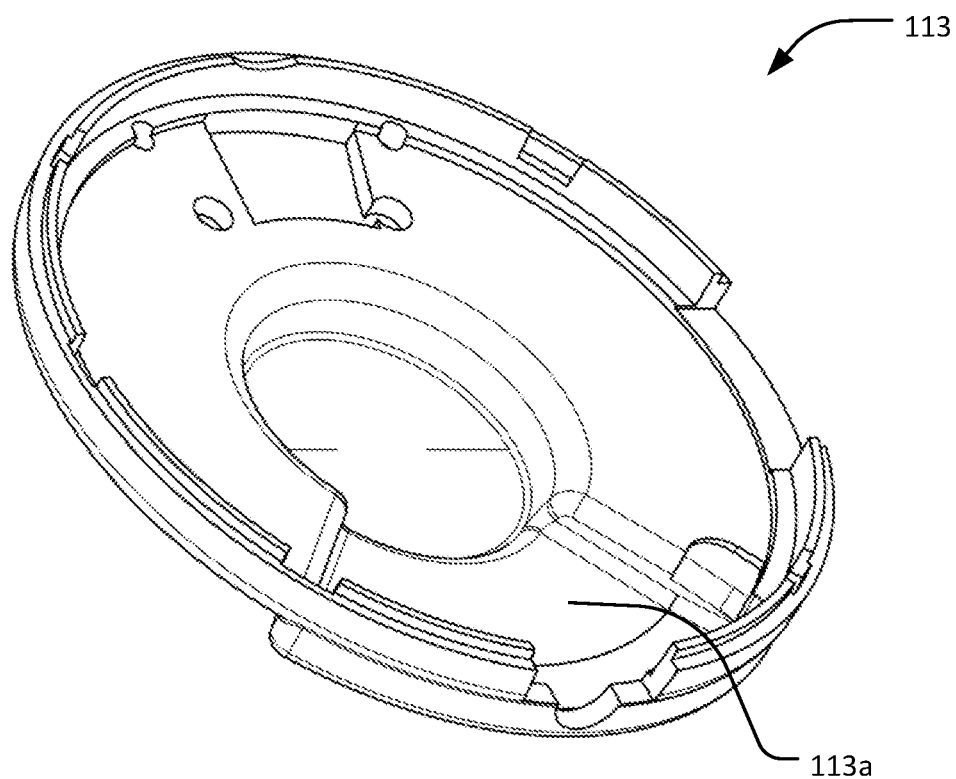
FIG. 10B is an opposite perspective view of the exterior housing of the two-way radio unit of FIG. 1.

The secondary clip 150 extends outwardly from the hub exterior side 111a such that the push to talk button 207 is unobscured by the secondary clip 150 and the hub exterior side 111a is between the secondary clip 150 and the hub interior side 111b. The secondary clip 150 may include an antenna support 152 and an antenna cap 154 (FIGS. 16A and 16B), with the antenna support 152 being on an interior side 151a of the secondary clip 150 and the antenna cap 154 being on an exterior side 151b of the secondary clip 150 (FIGS. 6 and 7). The antenna support 152 and the antenna cap 154 are coupled together (e.g., by clips, screws, and/or adhesive, et cetera) and define an antenna cavity 155 housing the antenna 215.

As described, the speaker 203, the first circuit board 201, the exterior housing 113, and the antenna support 152 are between the hub interior housing 115 and the antenna 215. In fact, the hub interior housing 115, the speaker 203, the first circuit board 201, the exterior housing 113, and the antenna support 152 are between the wearer and the antenna 215 when the unit 100 is worn at the ear as intended. And still further, the antenna support 152 spaces the antenna 215 out away from the wearer. All of this may be particularly important in reducing an amount of energy from the antenna 215 that reaches the wearer's head. Additionally, a shield (or "reflector") may be positioned between the antenna 215 and the wearer inside the unit 100. While such a reflector may be located in the antenna support 152 between the antenna 215 and the hub 110 or located at various places inside the hub 110 (or even on an outer surface of the antenna support 152 or the hub 110), it may be particularly beneficial to provide the reflector as a solid or mesh copper layer formed with or attached to the first circuit board 201. Such embodiments may allow sufficient transmission from the antenna 215 without undue interference while blocking a significant amount of energy from reaching the wearer and also maintaining a desirable size of the hub 110 and facilitating assembly.

Figure 17:
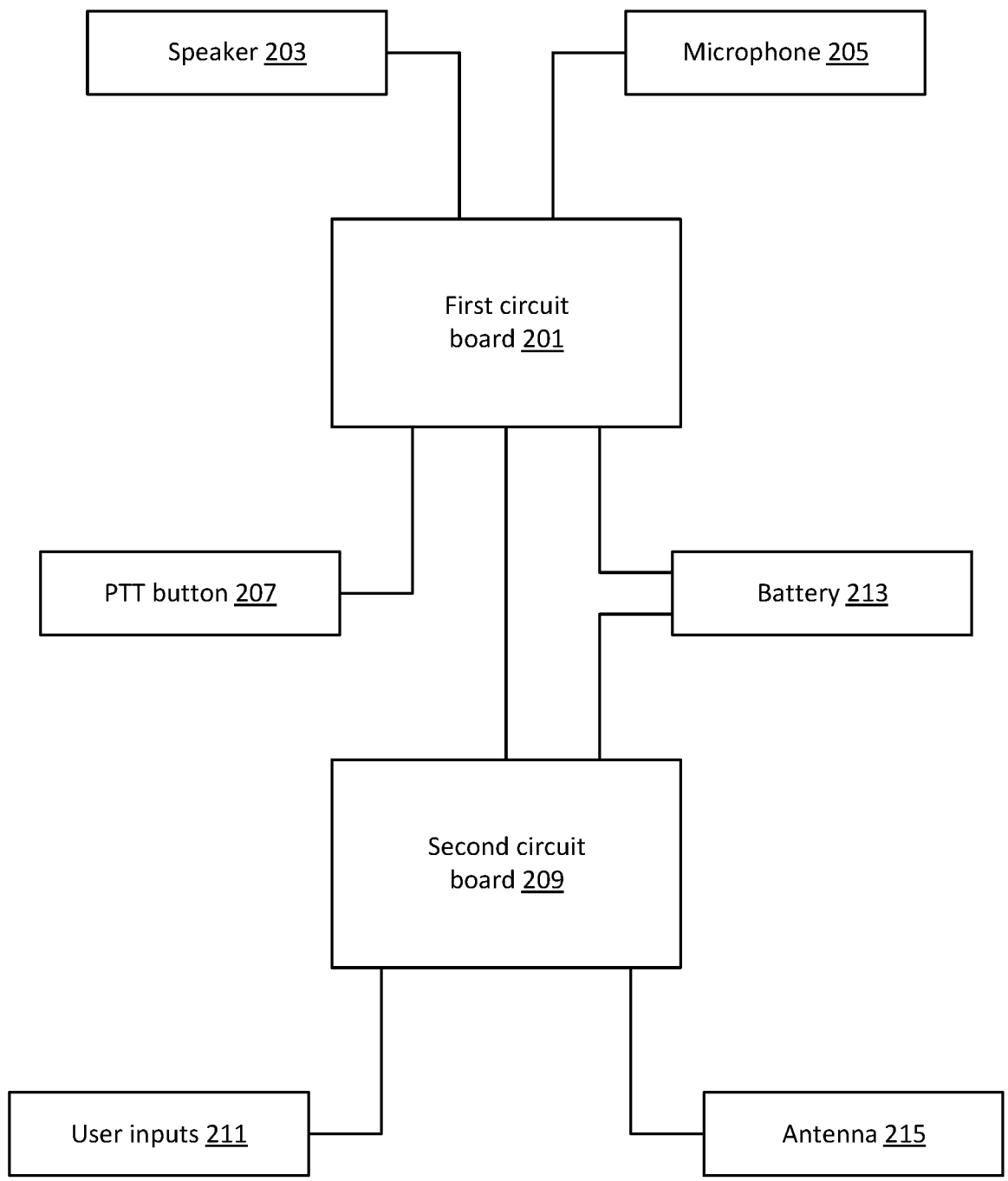
FIG. 17 is a block diagram of the two-way radio unit of FIG. 1.

FIG. 17 shows an example arrangement of the various electronic components. The speaker 203, the microphone 205, and the push to talk button 207 are shown in communication with the first circuit board 201, the user inputs 211 and the antenna 215 are shown in communication with the second circuit board 209, and the first and second circuit boards 201, 209 are shown in communication with one another. While this arrangement is currently preferred, other arrangements are of course possible and may nevertheless constitute improvements over the prior art.

Figure 18:
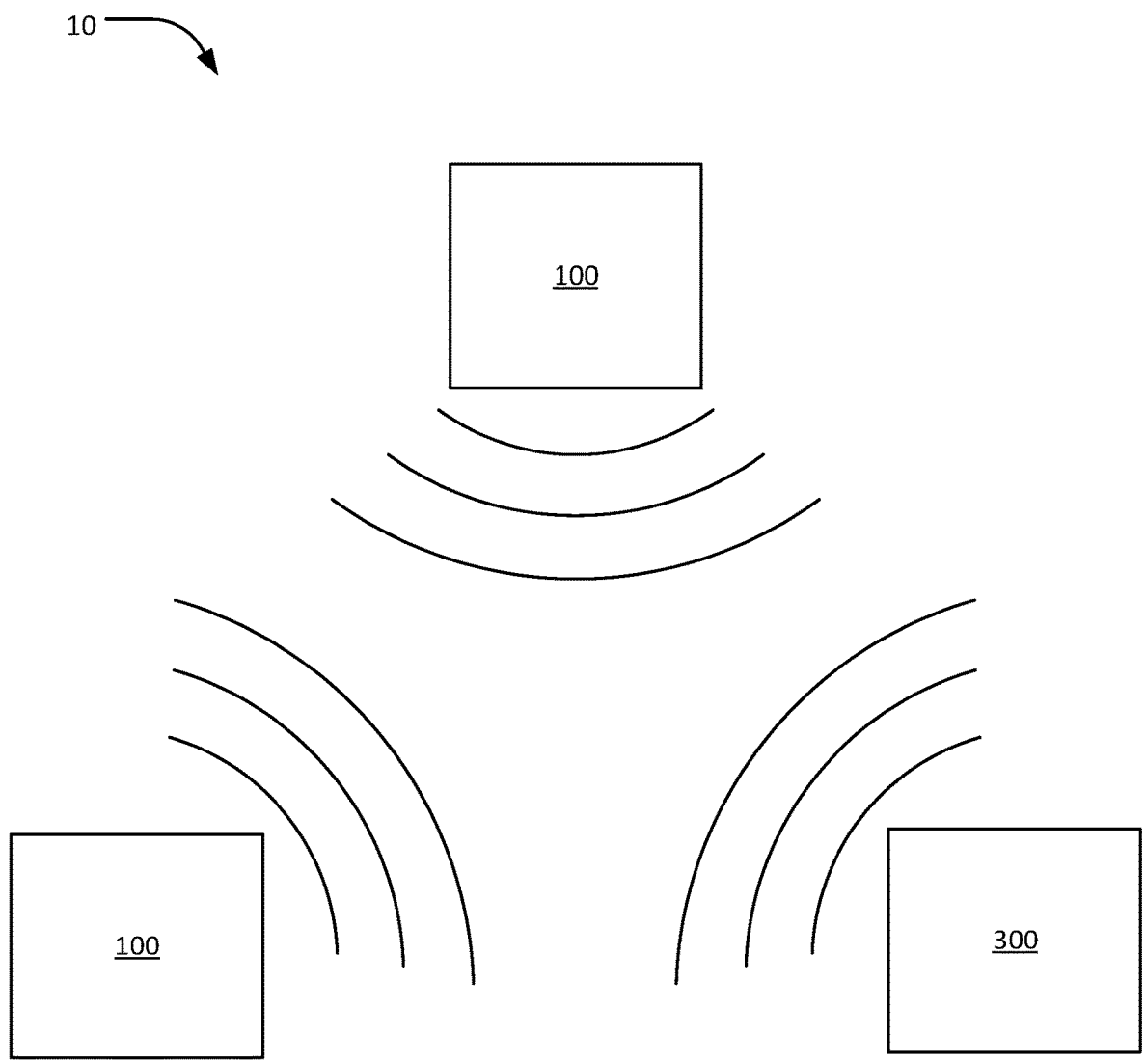
FIG. 18 is a block diagram of a short-range communication system having the two-way radio unit of FIG. 1, according to an embodiment of the current disclosure.

FIG. 18 shows a short-range communication system 10 having the two-way radio unit 100 of FIGS. 1-17. The system 10 includes multiple two-way radio units 100 for communication between one another. For example, the wearer of one of the units 100 may push the push to talk button 207. Upon actuation of the push to talk button 207, the unit's first circuit board 201 and/or the second circuit board 209 may cause the antenna 215 to output radio waves to transmit sounds obtained through the microphone 205. Those radio waves may then be received by the other units 100, and their first and/or second circuit boards 201, 209 may cause audible sound corresponding to the radio waves to be output through their respective speakers 203. The user inputs 211 of the various units 100 may be used to power the units 100 on/off, to adjust such things as speaker volume and radio channel, et cetera. While two units 100 are shown in FIG. 18, substantially more units 100 may be included. A handheld unit (or "walkie-talkie") 300 is also shown and may be used in the system 10 in addition to the ear-mounted units 100. Though significant benefits are associated with the ear-mounted units 100, handheld units 300 having a transmitter and a receiver or other radios having a transmitter and a receiver may nevertheless be used to transmit and receive radio waves on frequencies compatible with the units 100.

Very notably, the ear-mounted units 100 are capable of direct communication in the system 10 without a relay or repeater. For example, no belt-worn radio is necessary to relay signals to or from the units 100. Nevertheless, in some embodiments one or more stationary relay or repeater may be used to increase the transmission range of the units 100 and/or the units 300. And though generally less desirable, some embodiments may include one or more mobile relay or repeater (e.g., a belt-mounted unit) to relay signals to or from the units 100.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and subcombinations are of utility and may be employed without reference to other features and subcombinations and are contemplated within the scope of the present disclosure.

The invention claimed is:

1. A short-range communication system comprising a plurality of units, each said unit comprising:
    a hub having an exterior side and an interior side and a defining a hub cavity therebetween, the interior side having a speaker opening;
    a speaker in the hub cavity, the speaker having an output directed to the speaker opening;
    a primary clip extending from the hub for selective attachment to a wearer's ear such that the speaker opening is directed to an ear canal of the wearer, the primary clip having a distal segment and a proximal segment, the primary clip proximal segment connecting the primary clip distal segment to the hub, the primary clip proximal segment being resiliently flexible such that a distance between the hub and the primary clip distal segment is variable;
    a secondary clip extending outwardly from the hub exterior side such that the hub exterior side is between the secondary clip and the hub interior side;
    an antenna in the secondary clip; and
    a microphone.

2. The short-range communication system of claim 1, wherein each said unit further comprises a first circuit board in the hub cavity and a second circuit board in the primary clip distal segment.

3. The short-range communication system of claim 2, wherein each said unit further comprises a push to talk button on the hub exterior side, the push to talk button being unobscured by the secondary clip, the push to talk button being in communication with the first circuit board.

4. The short-range communication system of claim 3, wherein each said unit further comprises:
    a battery in the primary clip distal segment; and
    a user input coupled to the primary clip distal segment, the user input being in communication with the second circuit board.

5. The short-range communication system of claim 4, wherein in each said unit the primary clip proximal segment is rotatably coupled to the hub such that the primary clip is orbital about the hub.

6. The short-range communication system of claim 1, wherein in each said unit the primary clip proximal segment is rotatably coupled to the hub such that the primary clip is orbital about the hub.

7. The short-range communication system of claim 1, wherein in each said unit:
    the primary clip proximal segment has a neck;
    the hub includes:
        an exterior housing at the hub exterior side;
        an interior housing at the hub interior side; and
        a neck lock fastened to at least one item selected from the group consisting of the exterior housing and the interior housing to lock the neck to the hub while allowing the neck to rotate relative to the hub.

8. The short-range communication system of claim 1, wherein in each said unit:
    the hub includes an exterior housing at the hub exterior side and an interior housing at the hub interior side;
    a first circuit board is in the hub cavity;
    the secondary clip includes an antenna support and an antenna cap, the antenna support being on an interior side of the secondary clip, the antenna cap being on an exterior side of the secondary clip, the antenna support and the antenna cap defining an antenna cavity;
    the antenna is in the antenna cavity; and
    the speaker, the first circuit board, the exterior housing, and the antenna support are between the interior housing and the antenna.

9. The short-range communication system of claim 8, wherein in each said unit the first circuit board includes a solid copper layer for reflecting signals from the antenna, thereby preventing such signals from fully reaching the wearer's ear canal when the unit is worn by the wearer.

10. The short-range communication system of claim 8, wherein each said unit further comprises:
    a push to talk button on the hub exterior side, the push to talk button being unobscured by the secondary clip, the push to talk button being in communication with the first circuit board;
    a second circuit board in the primary clip distal segment;

a battery in the primary clip distal segment; and
a user input coupled to the primary clip distal segment, the user input being in communication with the second circuit board;
wherein the primary clip proximal segment is rotatably coupled to the hub such that the primary clip is orbital about the hub.

11. The short-range communication system of claim 1, wherein in each said unit the hub interior side has an annular surface and a recessed central area therein, the speaker opening being in the recessed central area.

12. The short-range communication system of claim 1, wherein in each said unit a diameter of the primary clip progressively enlarges along the proximal segment and the distal segment, with the diameter having a maximum value at the distal segment.

13. The short-range communication system of claim 1, further comprising a handheld radio having a transmitter and a receiver for wirelessly communicating with each said unit.

14. A two-way radio system comprising a plurality of units, each said unit comprising:
a hub having an exterior side and an interior side and defining a hub cavity therebetween, the interior side having a speaker opening;
a speaker in the hub cavity, the speaker having an output directed to the speaker opening;
a primary clip extending from the hub for selective attachment to a wearer's ear such that the speaker opening is directed to an ear canal of the wearer;
a secondary clip extending outwardly from the hub exterior side such that the hub exterior side is between the secondary clip and the hub interior side, the secondary clip having an antenna support and an antenna cap, the antenna support being on an interior side of the secondary clip, the antenna cap being on an exterior side of the secondary clip, the antenna support and the antenna cap defining an antenna cavity;
an antenna in the antenna cavity; and
a microphone.

15. The two-way radio system of claim 14, wherein each said unit further comprises a reflector between the antenna and the hub interior side for reflecting signals from the antenna away from the wearer's head.

16. The two-way radio system of claim 14, wherein each said unit further comprises:
a first circuit board in the hub cavity;
a second circuit board in the primary clip;
a battery in the primary clip; and
a user input coupled to the primary clip, the user input being in communication with the second circuit board.

17. The two-way radio system of claim 14, wherein in each said unit the primary clip is orbital about the hub.

18. The two-way radio system of claim 14, wherein in each said unit:
the primary clip has a neck;
the hub includes:
an exterior housing at the hub exterior side;
an interior housing at the hub interior side; and
a neck lock fastened to at least one item selected from the group consisting of the exterior housing and the interior housing to lock the neck to the hub while allowing the neck to rotate relative to the hub.

19. The two-way radio system of claim 14, wherein the antenna support and the antenna cap are coupled together.

* * * * *